US005150993A

United States Patent [19]

Miller

[11] Patent Number: 5,150,993

[45] Date of Patent: Sep. 29, 1992

[54] PIVOT ASSEMBLY FOR TOOL GUIDE

[76] Inventor: Bernard Miller, 5600 Munhall Rd., Pittsburgh, Pa. 15217

[21] Appl. No.: 828,283

[22] Filed: Jan. 30, 1992

[51] Int. Cl.⁵ ............ B23B 45/14

[52] U.S. Cl. ............ 408/110; 408/712

[58] Field of Search ............ 408/110, 112, 236, 712

[56] References Cited

U.S. PATENT DOCUMENTS

| | | | |
|---|---|---|---|
| 2,622,458 | 12/1952 | Jenkins . | |
| 2,831,376 | 4/1958 | Daniels . | |
| 2,953,045 | 9/1960 | Carles . | |
| 2,997,900 | 8/1961 | Pugsley . | |
| 3,077,129 | 2/1963 | Carles . | |
| 3,119,286 | 1/1964 | Forman et al. . | |
| 3,242,773 | 3/1966 | Van Praag . | |
| 3,534,639 | 10/1970 | Treichler . | |
| 3,853,420 | 12/1974 | Abell . | |
| 3,874,810 | 4/1975 | Russell . | |
| 3,890,058 | 6/1975 | Self et al. . | |
| 4,072,440 | 2/1978 | Glover . | |
| 4,082,474 | 4/1978 | Stiger . | |
| 4,132,496 | 1/1979 | Cunio . | |
| 4,240,771 | 12/1980 | Derbyshire | 408/712 |
| 4,391,558 | 7/1983 | Perry . | |
| 4,585,376 | 4/1986 | Davenport, Jr. et al. | 408/110 |
| 4,729,698 | 3/1988 | Haddon . | |
| 5,006,022 | 4/1991 | Miller . | |

FOREIGN PATENT DOCUMENTS

| | | | |
|---|---|---|---|
| 100421 | 2/1984 | European Pat. Off. | 408/110 |

*Primary Examiner*—Daniel W. Howell

*Attorney, Agent, or Firm*—Clyde I. Coughenour

[57] ABSTRACT

A guide for an axially movable hand-held tool, such as a drill, is disclosed. The guide has a base that supports a pivot assembly including a post attachment with a guide post and an angle locator, used with an adjustment shaft for angle cuts. A "U" bracket adjustably supports the post attachment on the guide base. One end of the adjustment shaft is shaped to prevent rotation while permitting reciprocation of the shaft within the "U" bracket. A handle cooperates with the adjustment shaft to clamp the pivot assembly to the "U" bracket and guide base at selected angles and is used to position and control the guide during use. A spring biases the post attachment toward one leg of the "U" bracket for angle selection, location and retention.

20 Claims, 3 Drawing Sheets

PIVOT ASSEMBLY FOR TOOL GUIDE

BACKGROUND OF THE INVENTION

1. Field of the Invention

The invention is to a guide means for portable hand-held tools used primarily for cutting. For stability, safety and cutting accuracy, assemblies or guide means are provided for hand-held tools. When cutting is to take place at an angle other than perpendicular to a surface, means are provided for adjusting the angle between the tool guide and the work surface and for controlling the tool movement during cutting. Provisions are made for cutting non-planar surfaces, such as curved surfaces, and for facilitating storage and transport.

2. Description of Related Art

The invention is a modification of and an improvement over the prior invention disclosed in applicant's U.S. Pat. No. 5,006,022 issued Apr. 9, 1991. In that patent there is disclosed a tool having a guide slot between the grip and drill proper used with a guide post positioned on a support base such that, with the guide slot positioned over the guide post, both the line of force applied to the tool grip and the line of force applied to a handle on the tool guide both pass within the footprint defined by the base of the tool guide. While provisions are made in that patent for angular cutting, the post is rigidly attached to the base and provides limited support, contact and stability on the work surface during angular cutting and the guide means is not particularly easy to store and transport.

The use of hand tool guides that have a pivoted attachment on a base for angular cutting are common in the art with Daniels; U.S. Pat. No. 2,831,376 issued Apr. 22, 1958; and Carles; U.S. Pat. No. 2,953,045 issued Sep. 20, 1990; and Carles; U.S. Pat. No. 3,077,129 issued Feb. 12, 1963; and Treichler; U.S. Pat. No. 3,534,639 issued Oct. 20, 1970; and Self et al; U.S. Pat. No. 3,890,058 issued Jun. 17, 1975; and Stiger; U.S. Pat. No. 4,082,474 issued Apr. 4, 1978; and Haddon; U.S. Pat. No. 4,729,698 issued Mar. 8, 1988; examples. The use of channels for cutting small and round objects is likewise old and in common use as shown by Carles and Haddon cited above; with Jenkins; U.S. Pat. No. 2,622,458 issued Dec. 23, 1952; and Pugsley; U.S. Pat. No. 2,997,900 issued Aug. 29, 1961; and Glover; U.S. Pat. No. 4,072,440 issued Feb. 7, 1978; additional examples.

SUMMARY OF THE INVENTION

The present invention is an improvement over the tool guides and supports of the prior art. A tool pivot assembly is provided that can be adjustably placed between or close to spaced supports. With the pivot assembly closed to a spaced support, the tool on the guide means can perform work almost as close to walls or other obstructions as with the tool alone. Plural securing positions are provided on the guide base central cross member so that the pivot assembly can be positioned on one end of the cross member or rotated 180 degrees and secured on the opposite end. The tool can be turned to face either direction on the guide post. This positioning and turning allows for either left or right hand use of the tool. The pivot assembly includes a "U" shaped bracket adjustably supportable on the guide support base central cross member. The "U" bracket is held in place on the central cross member by fasteners that are easily removed to reposition the bracket along the cross member or remove it for storage or transport. An adjustment shaft provides for pivotal movement of a post attachment. It has a shaped extension on one end to prevent rotation while permitting linear reciprocation on the "U" bracket. The post attachment includes a guide post for controlling movement of the tool, and an angle scale, for adjusting the angle between the guide post and base, and has a passage for the adjustment shaft with a recess for retention of a spring, for pressing one end of the post attachment against one leg of the "U" shaped bracket for retention and consistent location. A handle attaches to the other end of the adjustment shaft for clamping the post attachment to the "U" bracket, for locating the guide on the work, for holding the guide means in place on the work, and for providing stability during cutting. The spring can maintain contact between the post attachment and "U" bracket leg even when the handle is loosened or removed. One leg of the "U" bracket has an aperture that accommodates the shaped extension of the adjustment shaft and the other leg end or upper surface has an angle reference mark for use with the angle locator to adjust the angle of the guide post with respect to the guide base. The post attachment can be rotated on the adjustment shaft for cutting at an angle or storage or transport. The guide is provided with grooves and channels so that small or round stock can be cut. The guide post can be provided with a supplemental means for temporarily holding the hand-held tool on the guide post. The handle can be made hollow for storage of cutting means or other items. Adjustable stops can be provided to limit cut depth and scale markings can be provided on the guide post, spaced supports and/or cross members to assist location of a hand-held tool on the guide post and the pivot assembly on the guide base and the guide means on the work.

The present invention provides all the advantages of the prior invention and additionally provides:

adjustment of the cutting angle;

the full extent of the base in contact with the work surface being cut;

positioning of the tool on the base so that cutting can be performed close to walls or obstructions;

pivoting of the guide post so that it can be folded down or removed for storage or transport;

easy conversion from right to left hand use or vice-versa; a single handle for releasably clamping the guide post in a selected angular position, for positioning the base on the work and for holding the guide means in place during cutting;

a simple one shaft arrangement for clamping, pivotal adjustment of the guide post and attachment of the guide handle;

a guide and tool combination that permits "on the fly" angular adjustment without removing the users hands from the tool grip and guide handle;

an easily readable angle scale for angle selection;

a receptacle in the handle for storage; and channel means for cutting small and round stock material.

DETAILED DESCRIPTION OF THE PREFERRED EMBODIMENT

Figure 1:
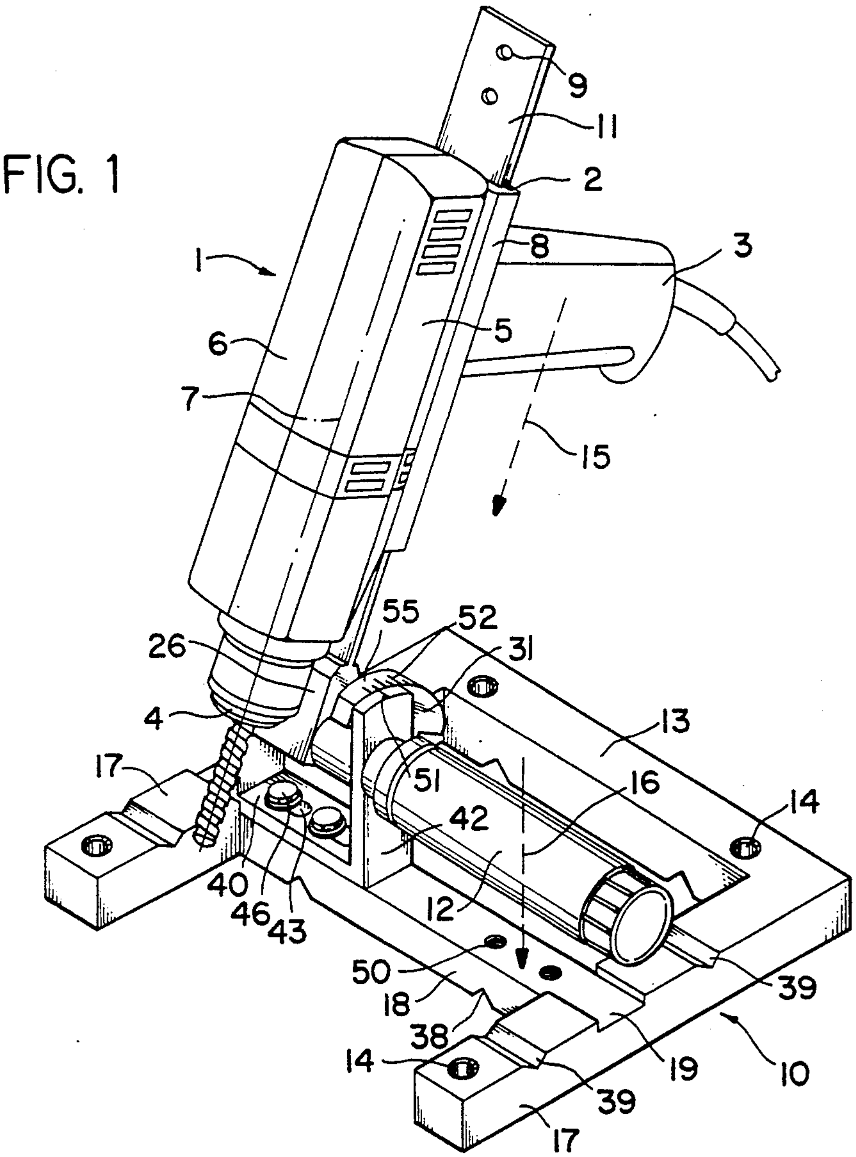
FIG. 1 is a perspective view of a hand-held cutting tool positioned on the pivot assembly guide post shown at an arbitrary angle with the guide base.
Figure 3:
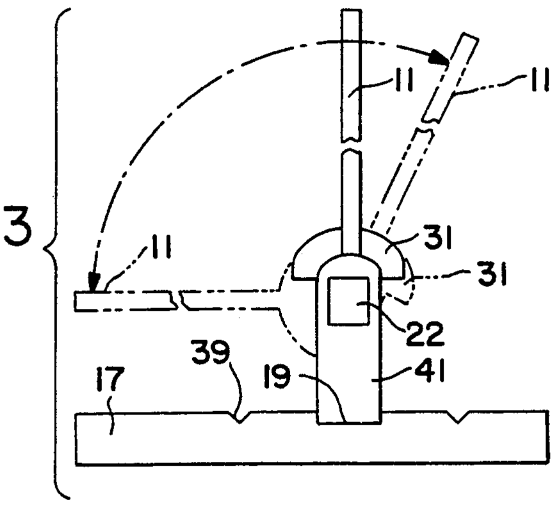
FIG. 3 is an elevational side view showing angular adjustment of the post on the pivot assembly with the tool in the perpendicular position in full lines and in oppositely angled positions in phantom lines.

In accordance with the previous invention, as shown in FIG. 1, a tool, such as a drill (1), is provided with an internal guideway (8) having a slot (2) on the same side of the tool as the gripping means (3). Such positioning leaves front (6) and sides (5) of the tool free for normal use, (i.e. off the guide means), and has the cutting means holder or chuck assembly of a drill (4) accessible for use of a drill chuck key and permits unobstructed visibility in the cutting zone during use. The guideway slot (2) is parallel to the tool axis (7) so that the line of force (15) applied to the tool grip advances the tool toward and into the work at the angle determined by the position of the guide post (11).

Figure 4:
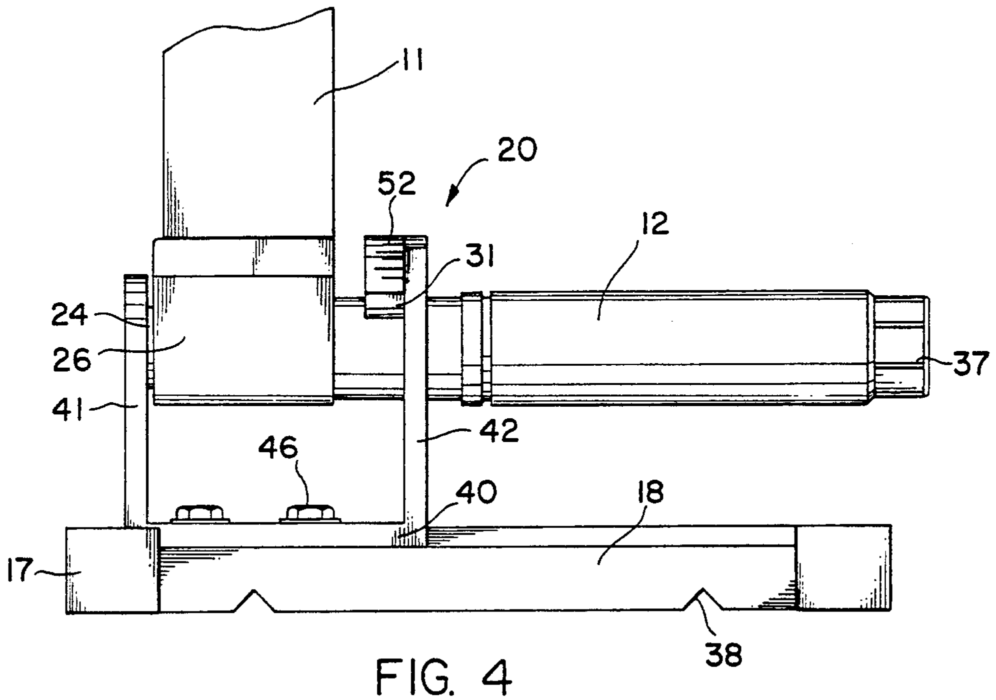
FIG. 4 is a front view of the pivot assembly on the guide means.

In accordance with the present invention, the guide as shown in FIGS. 1 and 4, has a guide means (10) with base members similar to that of the previous invention consisting of spaced supports (17) joined by an end cross member (13) and a central cross member (18) forming a footprint that encloses both the line of force (15) applied to a tool grip (3) and the line of force (16) applied to a handle (12) attached to a pivot assembly (20). The base members can be made of metal, plastic or other material. The spoaced supports (17) and/or cross member (13) can be provided with means for securing the guide to an object or surface to be worked on. Positioning apertures (14) are shown for this purpose. For operating on small objects, such as those that are cylindrical with a relatively small diameter, "V" channels (38) are provided in the bottom of the cross members (13,18) and "V" channels (39) are provided on the top of spaced supports (17). For securing a pivot assembly (20) to the guide means (10), attachment means are provided on the central cross member (18). While any desired securing means can be used, threaded apertures (50) are shown provided on both ends of the central cross member (18). Such provision permits an assembly, such as a pivot assembly (20), to be bolted to either end of the cross member. The pivot assembly (20) can be mounted on one end of the cross member near one spaced support (17) or turned 180 degrees and mounted adjacent the opposite end of the cross member near the other spaced support (17). The hand-held tool can be mounted on the guide post (11) facing in one direction or rotated 180 degrees and used on the post facing the other direction in either position of the pivot assembly on the central cross member (18). While the top surfaces of all the base members [i.e. spaced supports (17) and cross members (13,18)] may be coplanar, the central member (18) is shown with a top surface below that of the other base members (13,17). This provides additional hand clearance below the handle (12). Grooves (19) are provided on the spaced supports (17) with the groove bottoms coplanar with the top surface of the central cross member (18) so that an assembly, such as pivot assembly (20), can be positioned close to the edge of the spaced supports (17). This provides a "pilot" for the "U" bracket base (40). The sides of the spaced supports forming the grooves (19) permit the "U" bracket to be positioned over a spaced support and provide added support and help resist any torque forces created between the guide base (10) and pivot assembly (20) during use of the guide means.

A pivot assembly (20) is provided for adjusting the angle between the guide post and the guide base or object to be worked on. The pivot assembly may be of metal or plastic or a mix of the two with metal preferred. The primary parts of the pivot assembly are an adjustment shaft (21), a post attachment means (60), a handle (12), a spring (25) and a "U" bracket (40,41,42). The primary parts of the post attachment (60) are a main body (26), a guide post (11), and an angle locator (31). The pivot assembly (20) is shown attached to the guide means base (10) at an angle in FIG. 1. A hand-held tool (1) is positioned on the guide post (11) of the pivot assembly. In FIG. 4 the pivot assembly is shown attached to the guide base without a tool. With reference to the exploded perspective view of the pivot assembly shown in FIG. 2, a "U" shaped bracket with a base (40) having a first leg (41) and second leg (42) is shown. The lower surface (48) of the "U" bracket base is used as a clamping surface. While any of the known fasteners may be used, the "U" bracket base (40) is shown provided with one or more adjustment slots (43) that permit one or more clamp bolts (46) to secure the pivot assembly to the guide base. Standard washers (47) can be used. The slots allow the "U" bracket to be laterally adjusted along the central cross member (18). With this slot provision, the pivot assembly can be positioned close to the spaced support (17) edges or closer to the center of the central cross member (18) as desired.

The first leg (41) of the "U" bracket is provided with a shaped guide aperture (45). The shaped guide aperture (45) can be of any desired shape, but is shown as being square or rectangular. The second leg (42) of the "U" bracket is provided with an adjustment shaft passage (44). The length of the second leg (42) is not critical. It is shown as being longer than that of the first leg (41). The end or upper surface of the second leg (54) is curved with the center of curvature being the center line of the adjustment shaft (21) and/or the adjustment shaft passage (44). At the center of the second leg end or upper surface (54) an angle reference mark (51) is provided.

The "U" bracket supports an adjustment shaft (21) having a shaped extension (22) near one end and a fastening means, shown as shaft threads (23), on the other end. The extension (22) can be of any shape. A circular hole could be used in the first leg (41) with an adjustment shaft extension (22) larger than the circular hole to clamp a post attachment main body (26) onto the "U" bracket and base. However, a non-circular aperture (45) is preferred as it can be used with a similar size and shape extension (22) on an adjustment shaft (21). The shaped extension (22) can be placed in the shaped aperture (45). With the shaped extension (22) slightly smaller than the shaped aperture (45) the extension can slide in the aperture. Such a provision prevents the adjustment shaft from rotating on the "U" shaped bracket and permits the adjustment shaft to reciprocate laterally along its length within the "U" bracket.

Figure 2:
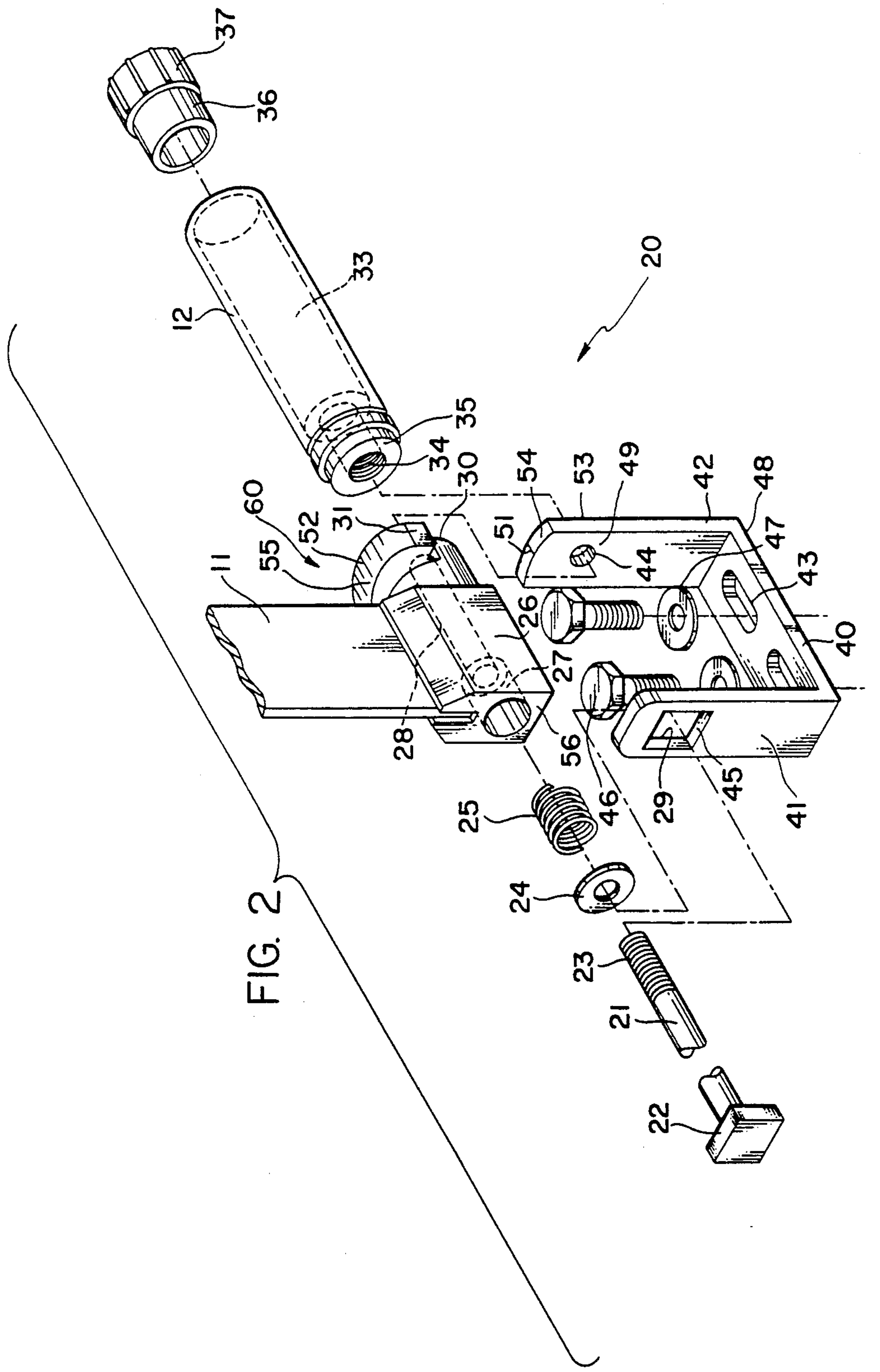
FIG. 2 is an exploded perspective view of the pivot assembly.
Figure 5:
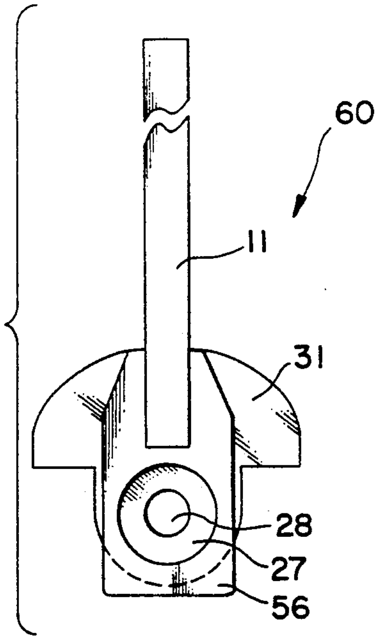
FIG. 5 is a left side view of the guide post attachment.
Figure 6:
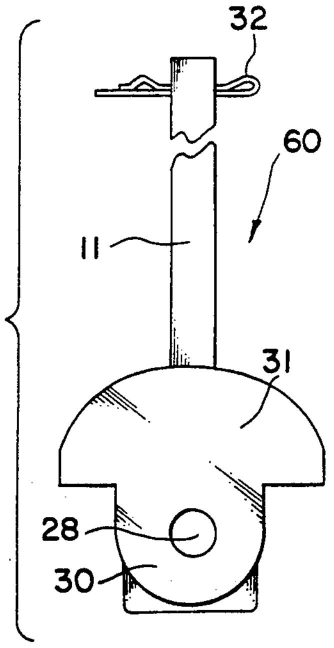
FIG. 6 is a right side view of the guide post attachment showing a spring clip in the top of the post.

The adjustment shaft (21) is used to secure a post attachment (60) to the "U" bracket. The post attachment is shown in all figures and featured in FIGS. 5 and 6. It includes a main body (26) with a guide post (11) and an angle locator (31) extending upwardly therefrom and with an adjustment bolt passage (28), for the adjustment shaft (21), and a recess for a bias spring. The recess is shown as a shouldered spring recess (27). An angle indication surface (55) is formed on an angle locator (31). It is curved and of the same radius as the end or upper surface of the second leg (42). The upper end of the second leg (54) and angle indication surface (55) form adjacent surfaces. The angle indication surface (55) is provided with angle indication marks (52) as shown in FIGS. 1, 2 and 4. By rotating the post attachment (60) on the adjustment shaft, the angle of the guide post can be adjusted with respect to the plane of the guide base and material to be worked on. To permit maximum penetration into the work, the angle locator (31) can be spaced from the guide post (11) as shown best in FIGS. 2 and 4. Even though, in the preferred form, the angle locator (31) is higher than the post attachment main body (26), the angle locator does not interfere with the internal guideway (8) of a tool. The tool can be moved downwardly on the guide post until it contacts the post attachment main body (26) or "U" bracket first leg (41). If contact with the first leg (41) is a problem, an adjustment washer (24) can be designed thick enough and the "U" bracket legs spaced to permit guideway (8) to pass between guide post (11) and first leg (41). To keep the angle locator (31) positioned against the "U" bracket second leg (42) and the angle reference mark (51) adjacent the angle indication marks (52), a spring (25) is placed around the adjustment shaft (21) within the shouldered spring recess (27). The spring presses against the "U" bracket first leg at an abutment surface (29) and against the base or shoulder of the spring recess (27) pressing the angle locator (31) at an abutment surface (30) against the "U" bracket second leg at an abutment surface (49). The adjustment washer (24) can be used to protect the abutment surface (29). Any of the abutment surfaces can be roughened or provided with friction material to improve holding power.

If desired, the spring (25) and the aperture (45) can be designed so that the spring can pass through the aperture and abut against the adjustment shaft shaped extension (22). With this design the pivot assembly can be put together by passing both the spring (25) and adjustment shaft (21) through the first leg aperture (45). With spring pressure on the shaped extension (22), loosening the handle (12) causes the adjustment shaft to move to the left in FIG. 2. With the spring (25) larger than the first aperture (45) or pressing against a washer (24) larger than the aperture (45), the post attachment (60) can be retained between the "U" bracket legs (41,42) by spring pressure even if the handle (12) and adjustment shaft (21) are removed.

To secure the post attachment (60) in a selected angular position a handle (12), shown in FIGS. 1, 2 and 4, is provided with a threaded adjustment shaft receptor (34). The handle can be of metal, plastic or other material. If made of plastic, a metal insert may be provided as the threaded adjustment shaft receptor. By screwing the handle onto the shaft threads (23), the shaped extension (22) of the adjustment shaft (21) is pulled through the shaped guide aperture (45) and presses against the post attachment (60) at abutment surface (56) either directly or through the adjustment washer (24). The post attachment is pressed against the "U" bracket second leg abutment surface (49) as the handle abutment surface (35) is pressed against the "U" bracket second leg abutment surface (53). This action clamps the handle (12) and post attachment main body (26) and "U" bracket (40,41,42) and guide base (10) together as one rigid unit. The spring (25) aids in keeping the post attachment (26) in contact with the second leg abutment surface (49) during loosening of the handle (12). The abutment surface (49) acts as a location surface for the guide means.

This design and arrangement of parts permits "on the fly" adjustment of the guide post angle with respect to the plane defined by the spaced supports. The angle can be changed without removing either the hand placed on the tool grip (3) or the hand placed on the guide handle (12). The hand placed on the handle releases the clamping action between it, the "U" bracket leg (42) and post attachment main body (26) by turning the guide handle. The hand placed on the tool grip is then used to apply pressure on the guide post to pivot the post attachment on the "U" bracket. The hand on the guide handle is then used to turn the guide handle to clamp the "U" bracket leg (42) between it and the post attachment main body (26) in the angular position selected. This "on the fly" adjustment can be made without deenergizing the tool.

The handle (12) can be made hollow (33) and provided with a plug (37) that is resilient or has a resilient friction extension (36). The space can be used for storage of tool bits or other objects. Non-permanent securing means may be provided to hold the hand-held tool onto the guide post (11) during storage and transport. The securing means is easily attached to or removed from the guide post. With the tool on the guide post and the securing means in place it prevents inadvertent removal of the tool from the guide post. As an example of means that may be used, the guide post (11) is shown with retainer apertures (9) in FIG. 1. These holes can be used with any convenient means such as bolts, clasps, ring means, a key chain, etc. A simple spring retainer (32) is shown on the guide post (11) in FIG. 6.

It is believed that the construction, operation and advantages of this device will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

What I claim is:

1. A tool guide pivot assembly for a hand held tool comprising:

a generally "U" shaped bracket having a base, a first leg and a second leg;

an adjustment shaft having a shaped extension near one end and an other end and being long enough to extend between said first and second legs of said "U" shaped bracket;

a post attachment means, shaped to fit between said first and second legs of said "U" shaped bracket, having a passage for said adjustment shaft;

a guide post attached to said post attachment means;

said first leg of said "U" shaped bracket having a shaped aperture for passage of said adjustment shaft;

said second leg of said "U" shaped bracket having an aperture for passage of said other end of said adjustment shaft;

a means for selectively adjusting the angle between said guide post and said "U" shaped bracket;

means for clamping said post attaching means in selected angular positions.

2. A tool guide pivot assembly for a hand-held tool as set forth in claim 1 wherein:

said means for clamping said post attaching means in a selected angular position include a handle provided with a means for engaging said adjusting shaft other end.

3. A tool guide pivot assembly for a hand-held tool as set forth in claim 1 wherein:

said post attachment means has a shouldered recess and a spring in said recess for pressing said post attachment means against said "U" shaped bracket second leg.

4. A tool guide pivot assembly for a hand-held tool as set forth in claim 1 wherein:

said "U" shaped bracket second leg has an angle reference mark on the end or upper surface thereof and said post attachment means has angle indication marks thereon to show the angle between said "U" shaped bracket and said guide post.

5. A tool guide pivot assembly for a hand-held tool as set forth in claim 1 wherein:

said adjustment shaft shaped extension and said shaped aperture of said first leg of said "U" shaped bracket are of a non-circular configuration to prevent rotation between said adjustment shaft and said "U shaped bracket and fit together so as to permit linear movement of said adjustment shaft shaped extension within said first leg shaped aperture.

6. A tool guide pivot assembly for a hand-held tool as set forth in claim 5 wherein:

an angle locator is provided on said post attachment means and spaced from said guide post so that a tool on said guide post can be moved down said guide post without encountering interference from said angle locator.

7. A tool guide pivot assembly for a hand-held tool as set forth in claim 1 wherein:

said post attachment has a shouldered recess and a spring in said recess for pressing said post attachment means against said "U" shaped bracket second leg;

said adjustment shaft shaped extension and said first leg shaped aperture are larger than said spring so that said pressing action originates between said adjusting shaft shaped extension and said shouldered recess.

8. A guide means for use with a hand-held tool comprising:

a base having spaced supports defining a footprint;

a cross member joining said spaced supports;

a first and a second leg spaced apart and extending from and above said cross member;

a passage in said second leg;

an adjustment shaft extending between said first and said second legs and through said passage in said second leg;

a post attachment means, shaped to fit between said first and said second legs and secured between said first and second legs;

a guide post attached to said post attachment means;

means for rotating said post attachment means for selectively adjusting the angle between said guide post and said footprint defined by said spaced supports;

means for securing said post attachment means at a selected angle.

9. A guide means for use with a hand-held tool as set forth in claim 8 wherein:

said adjustment shaft has an extension near one end and an other end and a length sufficient to extend between said first and second legs and being a part of said means for securing said post attachment means at a selected angle.

10. A guide means for use with a hand-held tool as set forth in claim 9 wherein:

said means for securing said post attaching means at a selected angle includes a handle provided with means for engaging said adjustment shaft other end.

11. A guide means for use with a hand-held tool as set forth in claim 9 wherein:

said first leg is provided with a shaped aperture for passage of said adjustment shaft;

said second leg passage is an aperture for passage of the said other end of said adjustment shaft;

said adjustment shaft extension is essentially the size and shape of said shaped aperture of said first leg such that said adjustment shaft shaped extension and said shaped aperture of said first leg fit together so as to prevent rotation and permit linear movement of said adjustment shaft within said first and second legs.

12. A guide means for use with a hand-held tool as set forth in claim 8 wherein:

said second leg has an angle reference mark on the end or upper surface thereof and said post attachment means has an angle locator with angle indication marks for use with said angle reference mark to disclose the angle between said guide post and said plane defined by said spaced supports.

13. A guide means for use with a hand-held tool as set forth in claim 8 wherein:

said first and second legs are the legs of a generally "U" shaped bracket with the base of said "U" shaped bracket secured to said cross member.

14. A guide means for use with a hand-held tool as set forth in claim 13 wherein:

said base of said "U" shaped bracket is provided with a slot so that the position of said "U" shaped bracket can be adjusted along the length of said cross member.

15. A guide means for use with a hand-held tool as set forth in claim 14 wherein:

said cross member upper surface is lower than said spaced supports upper surface and said spaced supports are grooved to permit said "U" shaped bracket to extend into the upper portion of said spaced supports and permit said hand held tool to cut in close proximity to said spaced supports and of support for said "U" shaped bracket.

16. A guide means for use with a hand-held tool as set forth in claim 14 wherein:

said "U" shaped bracket is secured to said cross member with fastening means, said cross member is provided adjacent each spaced support with means for securing said fastening means in position so that said "U"shaped bracket can be selectively positioned adjacent either spaced support.

17. A guide means for use with a hand-held tool as set forth in claim 12 wherein:

said angle locator has an angle location surface;

said end or upper surface of said second leg and said angle locator surface are curved and of the same radius and are adjacent each other.

18. A guide means for use with a hand-held tool as set forth in claim 11 wherein:

said post attachment has a shouldered recess and a spring in said recess for pressing said post attachment means against said second leg;

said first leg shaped aperture is smaller than said spring so that said pressing action originates between said first leg and said shouldered recess.

19. A guide means for use with a hand-held tool as set forth in claim 8 wherein:

said spaced support is provided with a "V" channel on the top and said cross member is provided with a "V" channel on the bottom for positioning small or round objects to be worked on.

20. A guide means for use with a hand-held tool as set forth in claim 8 wherein:

said guide post is provided with a securing means for temporarily holding a hand-held tool on said guide post during transport or storage.

* * * * *